US007483979B1

(12) United States Patent
Prager (10) Patent No.: US 7,483,979 B1
(45) Date of Patent: Jan. 27, 2009

(54) METHOD AND SYSTEM FOR VIRTUALIZING METADATA BETWEEN DISPARATE SYSTEMS

(75) Inventor: Scott H. Prager, Stratham, NH (US)

(73) Assignee: International Business Machines Corporation, Armonk, NY (US)

( * ) Notice: Subject to any disclaimer, the term of this patent is extended or adjusted under 35 U.S.C. 154(b) by 596 days.

(21) Appl. No.: 10/114,633

(22) Filed: Apr. 1, 2002

Related U.S. Application Data

(63) Continuation-in-part of application No. 09/760,612, filed on Jan. 16, 2001, now abandoned.

(51) Int. Cl.
*G06F 15/16* (2006.01)
(52) U.S. Cl. ........................................ 709/225; 709/201
(58) Field of Classification Search ................ 709/225, 709/230, 200, 201; 370/546; 705/500; 707/1, 707/3, 5, 9, 10
See application file for complete search history.

(56) References Cited

U.S. PATENT DOCUMENTS

| 5,201,046 | A | 4/1993 | Goldberg et al. | ............. 395/600 |
|---|---|---|---|---|
| 5,615,361 | A | 3/1997 | Leung et al. | ................. 395/603 |
| 5,757,920 | A | 5/1998 | Misra et al. | .................... 380/25 |
| 5,768,503 | A | 6/1998 | Olkin | .................... 395/187.01 |
| 5,806,079 | A | 9/1998 | Rivette et al. | ............... 707/512 |
| 5,822,750 | A | 10/1998 | Jou et al. | ........................ 707/2 |
| 5,870,747 | A | 2/1999 | Sundaresan | ................. 707/101 |
| 5,875,296 | A | 2/1999 | Shi et al. | ............... 395/188.01 |
| 5,899,986 | A | 5/1999 | Ziauddin | ........................ 707/2 |
| 5,913,061 | A | 6/1999 | Gupta et al. | ................. 395/680 |
| 5,931,900 | A | 8/1999 | Notani et al. | ............... 709/201 |
| 5,937,406 | A * | 8/1999 | Balabine et al. | ............. 707/100 |
| 5,940,819 | A | 8/1999 | Beavin et al. | .................. 707/2 |

(Continued)

OTHER PUBLICATIONS

U.S. Appl. No. 60/318,168, filed Sep. 9, 2001, Hussam, Ali A.*

(Continued)

*Primary Examiner*—Bunjob Jaroenchonwanit
*Assistant Examiner*—Julian Chang
(74) *Attorney, Agent, or Firm*—Seth H. Ostrow; Dreier LLP (57) ABSTRACT

A non-programmatic method for virtualizing the metadata of external systems at a front-end system is disclosed. The front-end system is provided with programmatic hooks that enable the external capture of its search for metadata and its commands to retrieve properties comprising selected metadata. When an end user of the front-end system requests to retrieve properties comprising selected metadata, typically through the use of a client device, an integrating system captures the search for metadata and provides a list of metadata both native to the front-end system and virtualized from disparate external systems.

The end user selects metadata in order to retrieve properties comprising the metadata. The integrating system captures the front-end system's command to retrieve the metadata. The integrating system converts the metadata request from the format of the front-end system to the format of the external system whose metadata was selected. The external system returns the properties comprising the requested metadata. The integrating system receives the resultant properties comprising the metadata, converts it to the format of the front-end system, and passes the resultant converted properties comprising the metadata to the front-end system for presentation to the end user.

16 Claims, 3 Drawing Sheets

U.S. PATENT DOCUMENTS

| | | | |
|---|---|---|---|
| 5,944,824 A | 8/1999 | He | 713/201 |
| 5,960,200 A | 9/1999 | Eager et al. | 395/705 |
| 5,995,597 A | 11/1999 | Woltz et al. | 379/93.24 |
| 6,000,033 A | 12/1999 | Keeley et al. | 713/201 |
| 6,003,065 A | 12/1999 | Yan et al. | 709/201 |
| 6,006,018 A * | 12/1999 | Burnett et al. | 709/219 |
| 6,006,214 A | 12/1999 | Carey et al. | 707/2 |
| 6,021,496 A | 2/2000 | Dutcher et al. | 713/202 |
| 6,065,120 A | 5/2000 | Laursen et al. | 713/201 |
| 6,078,924 A | 6/2000 | Ainsbury et al. | 707/101 |
| 6,078,926 A | 6/2000 | Jensen et al. | 707/103 |
| 6,088,451 A | 7/2000 | He et al. | 380/25 |
| 6,091,412 A | 7/2000 | Simonoff et al. | 345/335 |
| 6,122,639 A | 9/2000 | Babu et al. | 707/103 |
| 6,128,738 A | 10/2000 | Doyle et al. | 713/185 |
| 6,145,086 A | 11/2000 | Bellemore et al. | 713/202 |
| 6,154,751 A | 11/2000 | Ault et al. | 707/201 |
| 6,157,953 A | 12/2000 | Chang et al. | 709/225 |
| 6,178,511 B1 | 1/2001 | Cohen et al. | 713/201 |
| 6,453,339 B1 * | 9/2002 | Schultz et al. | 709/206 |
| 6,496,837 B1 * | 12/2002 | Howard et al. | 707/200 |
| 6,574,631 B1 * | 6/2003 | Subramanian et al. | 707/101 |
| 6,721,736 B1 * | 4/2004 | Krug et al. | 707/5 |
| 6,745,178 B1 * | 6/2004 | Emens et al. | 707/3 |
| 2002/0033844 A1 * | 3/2002 | Levy et al. | 345/744 |
| 2002/0152244 A1 * | 10/2002 | Dean et al. | 707/530 |
| 2003/0050927 A1 * | 3/2003 | Hussam | 707/5 |
| 2004/0255048 A1 * | 12/2004 | Lev Ran et al. | 709/249 |

OTHER PUBLICATIONS

U.S. Appl. No. 60/309,050, filed Aug. 2001, Lev Ran et al.*
U.S. Appl. No. 60/331,582, filed Nov. 2001, Lev Ran et al.*
U.S. Appl. No. 60/338,593, filed Dec. 2001, Lev Ran et al.*
US 6,021,479, 02/2000, Stevens (withdrawn)

* cited by examiner

METHOD AND SYSTEM FOR VIRTUALIZING METADATA BETWEEN DISPARATE SYSTEMS

The present invention is a continuation-in-part of application Ser. No. 09/760,612, entitled "METHOD AND SYSTEM FOR VIRTUALIZING LOGIC BETWEEN DISPARATE SYSTEMS", filed Jan. 16, 2001, which has been abandoned. The application is incorporated by reference herein in its entirety.

RELATED APPLICATIONS

This application is related to the following commonly owned patent applications, each of which applications are hereby incorporated by reference herein in their entirety:
application Ser. No. 09/881,374 filed on Jun. 14, 2001, entitled "METHOD AND SYSTEM FOR PROVIDING ACCESS TO COMPUTER RESOURCES THAT UTILIZE DISTINCT PROTOCOLS FOR RECEIVING SECURITY INFORMATION AND PROVIDING ACCESS BASED ON RECEIVED SECURITY INFORMATION", which is currently pending;
application Ser. No. 09/969,956 filed on Oct. 3, 2001, entitled "METHOD FOR CORRELATING DATA FROM EXTERNAL DATABASES", which is currently pending;
application Ser. No. 09/877,609 filed on Jun. 8, 2001, entitled "METHOD FOR PROCESSING EXTERNAL DATA FOR ACCESS AND MANIPULATION THROUGH A HOST OPERATING SYSTEM", which is currently pending; and
application Ser. No. 09/877,513 filed on Jun. 8, 2001, titled "VIRTUALIZING EXTERNAL DATA AS NATIVE DATA", which has been abandoned.

BACKGROUND OF THE INVENTION

The invention disclosed herein relates generally to methods for providing access to metadata. More particularly, the present invention relates to a method, system, and article of manufacture for virtualizing the metadata of information management systems by providing access to the metadata of a first computer system at a second computer system such that the metadata of the first system appears native to the second system.

Companies today often have computing infrastructures comprising many disparate computer systems, the need for which arises from such situations as where newly purchased systems must be integrated with older systems or where organizations with different systems merge. The result is that various portions of data and metadata, e.g., data used to describe data, needed by a company often exist on several different systems. For example, a company may have data in SAP, stored in IBM DB/2, and Lotus Domino. Database systems such as these support different methods and formats for defining metadata. IBM's DB2, for example, uses SQL tables and other constructs to store tabular data, while Lotus Domino uses free form documents and Forms. Indeed, even similar systems—such as relational databases from different vendors—support different data types, options and syntax for defining and working with metadata.

Companies also have the need to build applications that integrate information from all of their disparate software systems. Having a company's data on several different systems is undesirable since the metadata used to describe and display such data is implemented differently on each system. Furthermore, working with metadata in these disparate systems requires knowledge of the different metadata supported by these systems as well as significant breadth of knowledge and increased programming to work with the metadata from these systems in a single application. Developers who possess skill sets involving multiple software systems are less common, and such software is costly to build and deploy, thereby necessarily driving up costs involved with accessing the data.

In an effort to integrate systems, mechanisms have been developed to provide a rudimentary level of access to metadata being managed by disparate software systems. Systems such as ODBC and J2EE are standards that provide a single programmatic interface to multiple systems, so long as those systems are compliant with the standard. Through ODBC, for example, a SQL command to create a table can be sent to any compliant system. A significant drawback to techniques such as these, however, is that not all systems support some or all of these standards. Indeed, some are especially new and limited in availability. Secondly, these techniques each create a new language or programming interface for working with metadata, thereby requiring additional training on the part of developers, and new program code to be developed to get at the metadata. Furthermore, another drawback is that these techniques tend to result in a "least common denominator" approach whereby unique features of each system are lost.

There is thus a need for a system and method for virtualizing the metadata of disparate systems. Virtualization provides distinct programming models and data types that do not require the rewriting or creation of metadata, or program code to access metadata, on the part of the development staff of the company interfacing the disparate systems. The invention allows metadata resident in one system to be fully useable in a disparate system.

BRIEF SUMMARY OF THE INVENTION

The present invention provides a method and system for virtualizing the metadata of disparate computer systems to provide access to properties comprising the metadata while avoiding the drawbacks associated with existing systems as described above. Advantageously, this virtualization of metadata is performed without creating new programming code, thereby minimizing development time for providing access to metadata and associated data on disparate computer systems. Eliminating the need for new programming code further allows the virtualization of metadata to be performed by users that possess only minimal computer expertise.

The present invention comprises a method for providing access to properties comprising metadata of a first computer system at a second computer system, wherein the second system issues searches for metadata and commands to retrieve properties comprising the requested metadata that may be captured externally. The method comprises capturing a search for metadata issued from the second system and returning a list of metadata of the first system as a result for the captured search. A command to retrieve properties comprising the metadata issued from the second system is captured. If the metadata identified in the captured command is part of the list of metadata, the first system retrieves properties comprising the requested metadata, converts the properties comprising the metadata to a format native to the second system, and returns the data to the second system. The list of metadata may identify metadata of the first system that matches a search pattern.

Causing the first system to retrieve properties comprising the requested metadata may comprise extracting instructions associated with the command to retrieve properties comprising the requested metadata. The extracted instructions are provided to the first system, which instructs the first system to retrieve properties comprising the requested metadata according to the extracted instructions. Providing the extracted instructions may comprise converting the extracted instructions from a format associated with the second system to a format associated with the first system and passing the converted instructions to the first system. Converting the extracted instructions may comprise converting the extracted instructions from a format associated with the second system to a third format and converting the extracted instructions from the third format to the format associated with the first system.

The present invention also comprises a method for providing access to properties comprising requested metadata of a first computer system at a second computer system using a third computer system, wherein the properties comprising the metadata of the first system are externally accessible, and wherein the second system issues searches for metadata and commands to retrieve properties comprising the requested metadata that may be captured externally. The method comprises capturing, at the third system, a search for metadata issued from the second system and returning, from the third system to the second system, a list of metadata at the first system. The third system captures a command to retrieve the properties comprising the requested metadata from the second system. If the metadata identified in the captured command is contained within the list of metadata associated with data at the first system, the method comprises causing, from the third system, the first system to retrieve the properties comprising the metadata, converting, at the third system, the properties comprising the requested metadata from the first system to a format native to the second system, and returning the data to the second system from the third system.

The method may comprise associating the third system with the second system, prior to the capture of the search, so as to enable the third system to capture searches for metadata and commands to retrieve properties comprising the requested metadata issued from the second system. The second system may use hooks to enable the external capture of searches for metadata and commands to retrieve properties comprising the requested metadata, wherein associating the third system with the second system comprises registering the third system as a client of the hooks.

Also contemplated by the invention is a method for providing access to properties comprising requested metadata of a first computer system at a second computer system, wherein the metadata of the first system is externally retrievable, and wherein the second system issues searches for metadata and commands to retrieve properties comprising the requested metadata that may be captured externally. The method comprises receiving a list of externally retrievable metadata of the first system and capturing a command to retrieve properties comprising metadata issued from the second system. If the list comprises metadata identified in the captured command, the first system retrieves the properties comprising the requested metadata.

Also provided by the invention is a method for providing access to properties comprising requested metadata of a first computer system at a second computer system, wherein the metadata of the first system is externally retrievable, and wherein the second system issues searches for metadata and commands to retrieve properties comprising requested metadata that may be captured externally. The method comprises capturing a search for metadata issued from the second system and returning a list of externally retrievable metadata of the first system as a result for the captured search. The method may comprise presenting the list to a user, which may be previously provided by an administrator.

In addition of the foregoing methods of operation, the present invention introduces a system for providing access to properties comprising requested metadata of a first computer system at a second computer system, wherein the metadata of the first system is externally retrievable, and wherein the second system issues searches for metadata and commands to retrieve properties comprising requested metadata that may be captured externally.

The system comprises means for capturing a search for metadata issued from the second system, means for returning a list of externally retrievable metadata of the first system, and means for capturing a command to retrieve properties comprising the requested metadata issued from the second system. If the list comprises metadata identified in the captured command, the system provides means for causing the first system to retrieve properties comprising the requested metadata, converting the properties comprising the requested metadata from the first system to a format of the second system, and returning the properties comprising the requested metadata to the second system.

The means for causing the first system to retrieve properties comprising the requested metadata may comprise means for extracting instructions associated with the command to retrieve properties comprising the requested metadata, means for providing the extracted instructions to the first system, and means for instructing the first system to retrieve properties comprising the requested metadata according to the extracted instructions. The means for providing the extracted instructions may comprise means for converting the extracted instructions from a format associated with the second system to a format associated with the first system and means for passing the converted instructions to the first system. Furthermore, the means for converting the extracted instructions may comprise means for converting the extracted instructions from a format associated with the second system to a third format and means for converting the extracted instructions from the third format to the format associated with the first system.

According to embodiments of the invention the list is created by an administration tool using information received from a user, the information comprising information associated with the first system, information associated with the second system, and information associated with the metadata of the first system for which access is to be provided at the second system. The properties comprising the requested metadata may comprise a search pattern that the administration tool uses to extract from the first system the identities of the metadata for which access is to be provided at the second system.

The invention disclosed here further presents a computer program product comprising a computer usable medium having computer readable code embodied therein, the computer readable code, when executed, causing a computer to implement a method for providing access to the properties comprising requested metadata of a first computer system at a second computer system, wherein the metadata of the first system is externally retrievable, and wherein the second system issues searches for metadata and commands to retrieve properties comprising the requested metadata that may be retrieved externally. The computer program product includes computer readable program code configured to cause a computer to capture a search for metadata issued from the second system, computer readable program code configured to cause a computer to return a list of metadata of the first system as a result for the captured search, and computer readable program code configured to cause a computer to capture a command to retrieve properties comprising the requested metadata issued from the second system. If the list comprises metadata identified in the captured command, the invention provides computer readable program code configured to cause a computer to cause the first system to retrieve properties comprising the requested metadata, return the properties comprising the requested metadata from the first system, and return the properties comprising the requested metadata to the second system.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE PREFERRED EMBODIMENTS

Embodiments of a method, system, and article of manufacture containing software programs for virtualizing metadata in accordance with the present invention is described with reference to the drawings in FIGS. 1-3.

Figure 1:
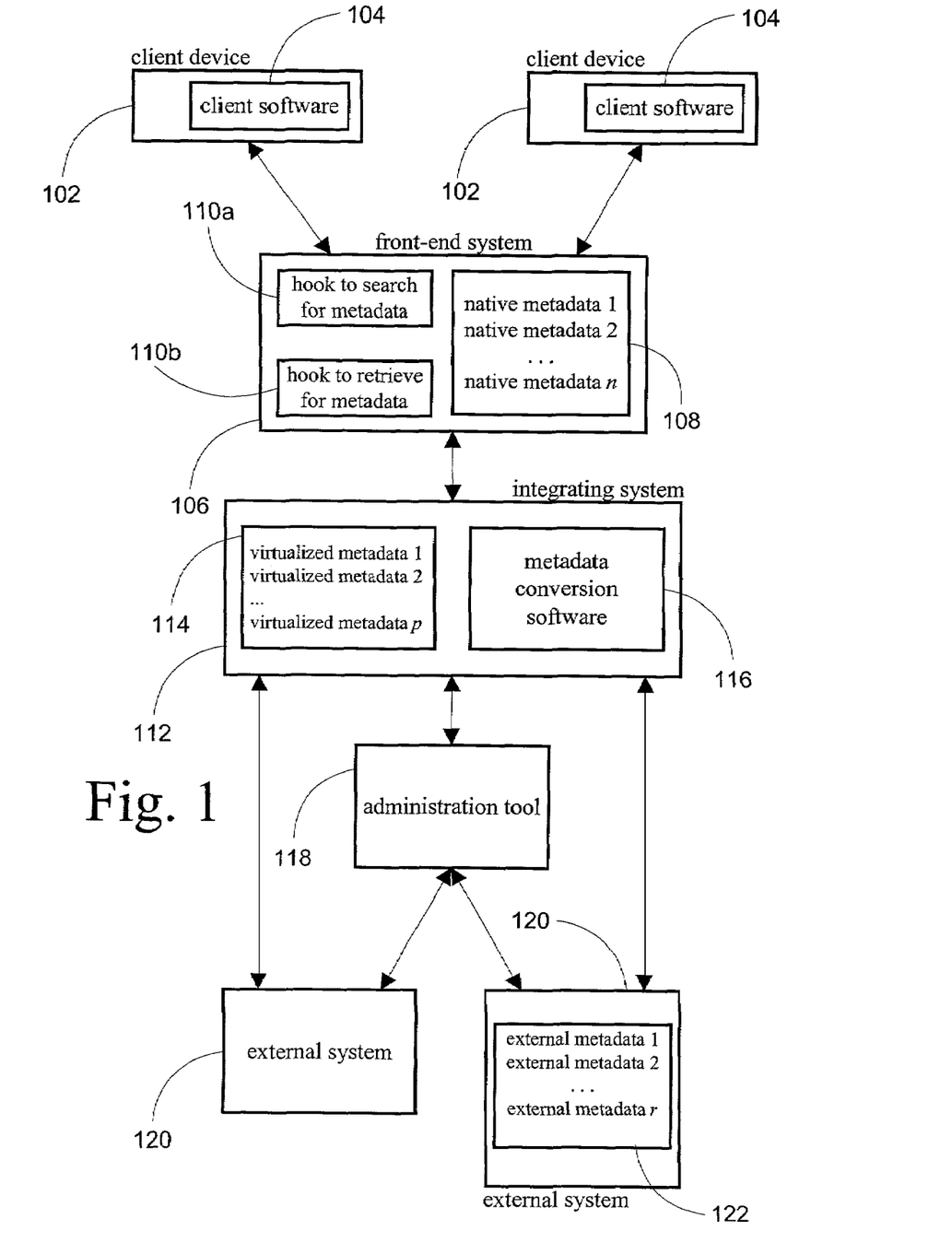
FIG. 1 is a block diagram presenting the interaction of various hardware and software systems in order to virtualize metadata according to one embodiment of the present invention.

FIG. 1 is a block diagram showing the operating environment of a system of the present invention. Front-end system 106 is a computer system that directly communicates with one or more end users each operating a client device 102, each client device storing and executing client software. Front-end system 106 contains native metadata 108 that may describe the content and formatting of data that it is associated with. This metadata 108 is "data that describes data". More specifically, metadata is instrumental in transforming raw data into knowledge. For example, metadata may define that a give stream of bits is a customer's address, part of a photographic image, or a fragment of program code in a given system's machine language. The metadata is used by a receiving system to format the associated data for presentation to the user. Corruption of metadata typically renders the underlying data useless. Front-end system 106 contains metadata 1 through n 108. The metadata 108 shown for front-end system 106 is internal to the front-end system 106 and may be referred to as "native" metadata, e.g., it describes the underlying data in a format that is native to the front-end system.

Front-end system 106 also includes two hooks 110a and 110b. Hooks are well known to those of skill in the art as providing a means through which a request, e.g., for metadata, program logic, etc., may be captured and redirected to an integrating system. Front-end system 106 includes a first hook 110a that allows an integrating system to capture the execution of a search for metadata. When an end user of front-end system 106 chooses to retrieve properties comprising metadata, front-end system 106 executes a search to identify the metadata that is available to the user. If no integrating system is linked to hook 110a, then this search returns only a list of metadata 108 native to front-end system 106. The list is then presented to the end user on the client device 102.

If, however, an indication has been provided to front-end system 106 that an integrating system is linked to the hook 110a, the search for metadata will be captured and redirected to the integrating system linked to hook 110a. The integrating system may return its own list of metadata to the front-end system 106. Afterwards, execution may continue with the search to identify native metadata. Thus, if an integrating system is linked to the hook 110a, in response to a metadata search request from a client 102 (which may be the user or software executed on the client device), the front-end system 106 presents a list of metadata that may include metadata identified by the integrating system as well as metadata native to the front-end system 106.

Front-end system 106 also includes a second hook 110b that allows an integrating system to capture requests to retrieve metadata outside the front-end system 106. As described above, when an end user chooses to retrieve properties comprising metadata, a search is executed and a list of available metadata is returned. This list is presented to the client 102 and the desired metadata is selected for retrieval. If no integrating system is linked to the hook 110b, the front-end system issues a command to return native metadata 108 and presents the results to the client 102, which may be utilized by the client software 104. Alternatively, an error may be returned indicating the requested metadata is not available for retrieval.

Where an indication has been provided to front-end system 106 that an integrating system is linked to the hook 110b, the address of the integrating system and data identifying the metadata that was selected to be retrieved is captured and redirected to the integrating system linked to the hook 110b. The integrating system may then use the request to convert the metadata to a format native to that of the front-end system 106 and return the native metadata to front-end system 106. Alternatively, if analysis of the requested metadata indicates that native metadata is selected, then the integrating system may simply return to allow the front-end system 106 to use the requested metadata to format the associated data.

Thus, the front-end system 106 may be any computer system that comprises hooks for searching for metadata 110a and capturing requests 110b to retrieve properties comprising metadata. More specifically, a hook 110b is required that enables an integrating system to capture requests to retrieve the data associated with the metadata not at front-end system 106 and return the metadata to the front-end system 106. Lotus Domino is an example of a computer system that may serve as front-end system 106. Other examples of systems that may serve as front-end systems include database programs, groupware programs, etc.

Also illustrated in FIG. 1 are one or more external systems 120, which may also be referred to as back-end systems. Each external system 120 is a distinct system, which may comprise computer hardware and/or computer software, and also contain data that may be represented via metadata. Each external system includes metadata 1 through m 122, some or all of which may be retrieved by a system external to that particular back-end system 120, e.g., integrating system 112. Advantageously, the integrating system 112 is designed such that a plurality of external systems 120 may be accessed by the front-end system 106 for metadata retrieval, e.g., a single integrating system virtualizing metadata from a plurality of external systems.

An external system 120 may thus be any system having metadata that may be cataloged and retrieved by an integrating system. The term catalog is used here broadly to refer to any technique or method through which an integrating system may request and receive from the external system the identities of all metadata of the external system. Examples of computer systems that may serve as external systems 122 include IBM DB/2, Oracle database systems, Microsoft Access, and Lotus Domino.

The system of the present invention uses an integrating system 112 to virtualize selected metadata from one or more external systems 120 for use by the front-end system 106. It should be noted that, according to embodiments of the invention, the integrating system 112 is responsible for capturing hooked calls from the front-end system 106, e.g., the integrating system 112 is the device that is triggered when the front-end system 106 calls a hook 110a and 110b. Once the metadata is virtualized by the integrating system 112, the external metadata 122 of an external system 120 may be presented to and used to format data by end users of a client device 102. Similarly, metadata native to the front-end system 106 may be presented to and may be used to format data by end users from the client device 102. Formatting data is an illustrative application of accessible metadata, which may also be utilized to transform, validate, or otherwise operate on data.

Also provided is an administration tool 118. The administration tool 118 is used to identify both external systems 120 that comprise metadata to be virtualized and the specific metadata from the external system(s) 120 that is to be virtualized. The administration tool 118 may also know the identity of the front-end system 106 through which the virtual metadata is to be presented and invoked. A system administrator may provide the identity of the front-end system 106 to the administration tool 118. Alternatively, the identity of front-end system 106 may be predetermined.

The administration tool 118 includes a user interface, for example, character based or graphical, through which it obtains the above information from a human operator, e.g., the administrator. This information is stored at administration tool 118 until required by the integrating system 112. Administration tool 118 passes this information to the integrating system 112, which stores the names, IDs or search patterns of the metadata to be virtualized in a list 114. According to some embodiments of the invention, the administration tool 118 is a component of the integrating system 112. Alternatively, the administration tool 118 may be a system separate and distinct from the integrating system 112.

Integrating system 112 also includes a conversion mechanism 116 used for converting metadata outside of the integrating system into central metadata format and vice versa. Thus, the conversion mechanism provides a "hub-and-spoke" technique that allows the integrating system to convert properties comprising metadata of a first system into properties comprising metadata of a second system. The integrating system converts the metadata format of the first system into the central metadata format of the conversion mechanism and then converts the central metadata format to the metadata format of the second system.

With virtualization, end users or software processes 104 at client devices 102 that request to retrieve metadata from the front-end system 106 are presented with a list of metadata that is responsive to the request. The list includes the names of native metadata 108 from the front-end system 106 and the names of virtualized metadata from the integrating system 112. All of the metadata presented on this list, both native and virtual, are presented to the end user as though they were native to and directly accessible through the front-end system 106. According to alternative embodiments, the presence or absence of native metadata is optional whereby it may "suppressed" at the direction of a controlling software process or as defined by the end user through a preference profile (not pictured) or the like.

Figure 2:
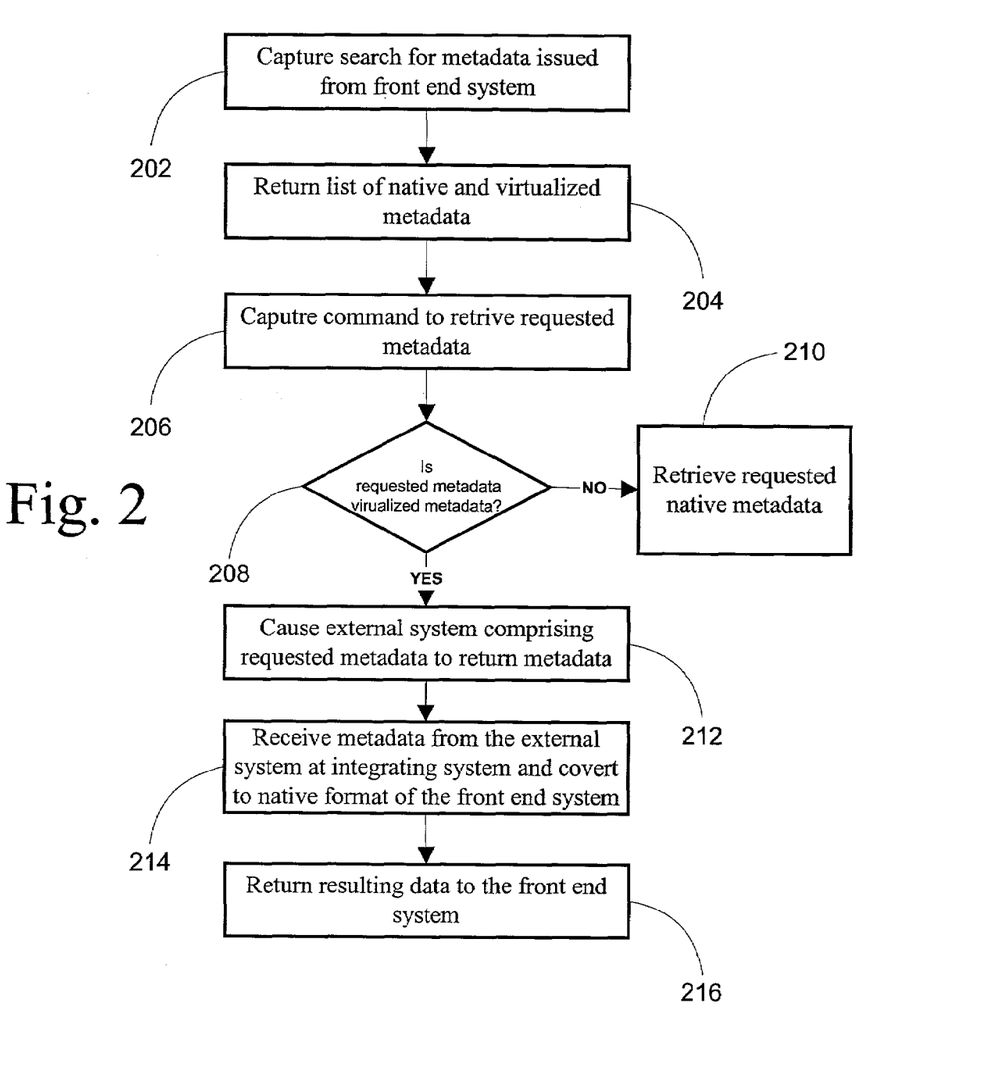
FIG. 2 is a flow diagram presenting the operation of a system for virtualizing metadata according to one embodiment of the present invention.

FIG. 2 is a flow chart describing the steps performed by one embodiment of the invention in virtualizing metadata. A search for metadata issued from the front-end system ("FES") is captured by the intermediate system, step 202. According to some embodiments, a user operating a client device in communication with the FES generates this search request, either explicitly or implicitly through a function call within a piece of software being used. A list of the external metadata from the external systems ("ES") that is to be virtualized is returned to the FES as a result of the captured search, step 204, which may be presented alongside native metadata. When the FES issues a command to retrieve requested metadata, that command is captured, step 206, and it is determined by the intermediate system whether the requested metadata identified in the command is native to the FES or contained in the list of virtualized metadata resident on an ES, step 208.

Where the requested metadata is not contained in the list of virtualized metadata, e.g., the FES has requested native metadata, the requested metadata is returned to the front-end system, step 210. According to embodiments of the invention, the returned properties comprising the requested metadata are presented to the user on the client device, typically on an integrated or attached display device. If, however, the identified metadata is virtualized metadata, the properties comprising the requested metadata are retrieved and returned to the requesting system, step 212. The integrating system receives the returned metadata from the external system, where it is converted to the native format of the front-end system, step 214. The intermediate system returns the resulting converted properties comprising the metadata to the front-end system, step 216. Alternatively, the metadata from the external system may be cached, thereby eliminating the need to communicate with the external system to satisfy each request.

Figure 3:
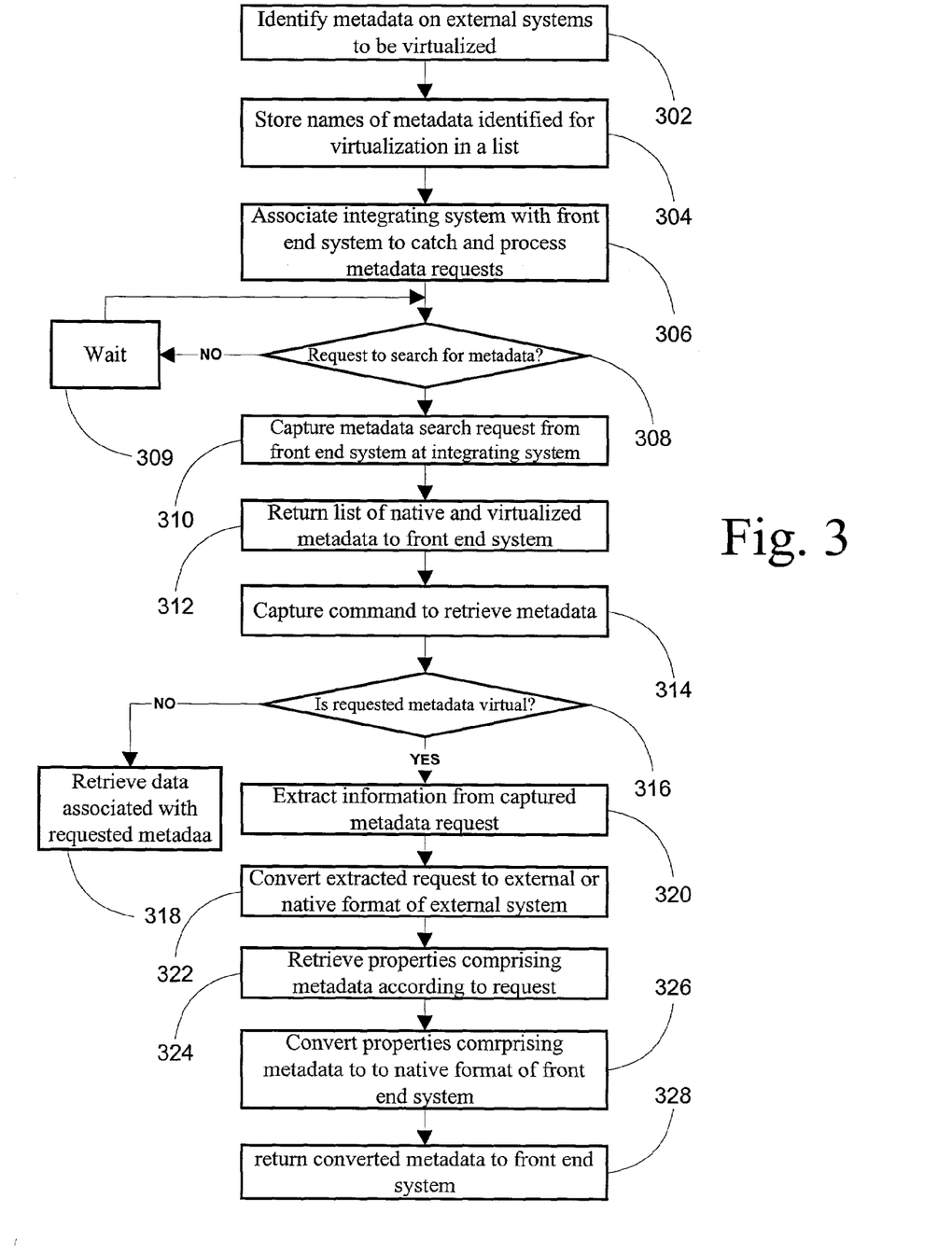
FIG. 3 is a flow diagram further presenting the operation a system for virtualizing metadata according to one embodiment of the present invention.

FIG. 3 is a flow diagram that further illustrates how the metadata virtualization of the present invention is accomplished. The external systems that comprise external metadata that is to be virtualized are identified, step 302. Through use of the administration tool, a human administrator may identify these systems and the metadata contained in these external systems, step 302, for example, by filling out an electronic form provided by administration the tool. The information collected at step 302 identifies the front-end system through which the virtual metadata is presented and invoked (e.g., Lotus Domino or Notes database). Information collected also includes the address of the one or more external systems (e.g., Oracle database, IBM DB/2) and the external metadata from these external systems that is to be virtualized, step 304. Other information regarding the external systems and metadata contained therein may also be collected and stored through use of the administration tool.

The administrator may identify metadata to be virtualized by providing their names and their corresponding parameters, if any. Alternatively, a search pattern may be specified and passed to the external system to determine and return a list of external metadata matching the search pattern. For example, to retrieve metadata for virtualization, the administrator may specify a character string containing a wildcard character, e.g., "a*" (the letter "a" and a wildcard). In response to this search request, the external system returns a list of all its external metadata having names beginning with the letter "a". It should be noted, however, that other techniques for identifying metadata that are well know to those of skill in the art may also be employed by the present invention.

The administration tool may also provide for the conversion of the names of the external metadata into forms more readily understandable by an end user such as the human administrator operating the administration tool. For example, an external system may have external metadata comprising names consisting of a combination of letters and numbers that the developer of external system may have initially assigned, which are unintelligible to an end user. The administration tool may provide a mapping whereby metadata names from an external system are mapped to names describing the purpose of the metadata. The administration tool passes the identifier or address of the front-end system, the external system information, and a list of metadata to be virtualized, to the integrating system. The names of the metadata to be virtualized are stored in a list at the integrating system, step 304.

The integrating system is associated with the front-end system so that the front-end system's search for metadata, as well as commands to retrieve parameters comprising requested metadata, are captured and redirected to the integrating system, step 306. This association may be accomplished in various ways depending on the specific system being used as the front-end system. For example, Lotus Domino supports hooks for capturing and redirecting both searches and commands through Domino Extension Manager. An outside system may register with Domino to be a client of these hooks, e.g., the integrating system, by adding an appropriate entry in an initialization file, such as an ".ini" file, and providing the code for the integrating system, such as through a "shared library" or a ".dll" file. Although the association step is presented at step 306, it should be appreciated by one of ordinary skill in the art that this association step may occur prior to steps 302 or 304.

The integrating system is initialized and waits for a request to search for metadata to be received at the FES, steps 308 and 309. Due to the association created between the FES and the integrating system, all such requests received at the FES are captured and redirected to the integrating system, step 310. The integrating system returns the previously generated and stored list identifying metadata to be virtualized to the FES, which allows the FES to present and have access to both native and external metadata, step 312.

The names of the returned metadata, both native to the FES and virtual to FES (exposed via the integrating system), are presented to the client device via the FES. It should be noted by those skilled in the art that metadata need not necessarily be identified by name and other metadata identification methods, e.g., identification be an internal identifier, are contemplated as falling within the scope of the invention. Metadata is selected from the listed metadata to retrieve its associated data, which may be used, for example, in an application executing on the FES or client device. In addition to explicit selection of metadata, metadata may be implicitly obtained as is necessary for execution of a request or similar function call, which may be issued by a user or another computing system.

The FES issues a command to retrieve the parameters comprising the metadata selected from the list. Due to the association created between the FES and integrating system, all commands to retrieve parameters comprising selected metadata at the FES are captured and redirected to the integrating system, step 314. The integrating system evaluates the received command to determine if the metadata selected is native or virtual to the FES, step 316.

The integrating system may determine whether the selected metadata is virtual metadata in a number of ways, step 316. For example, the name of the selected metadata may be compared with the list containing the names of the metadata to be virtualized to determine if the selected metadata appears on the list. Alternatively, a naming convention may be used where names having one format are native and names having a different format are virtual. Thus, the integrating system may determine whether the selected metadata is native or virtual simply from an examination of the metadata name.

If the selected metadata is native, then the integrating system returns control to the FES to allow it to normally retrieve and present the parameters comprising the requested metadata, step 318. If the selected metadata is virtual metadata, the integrating system extracts information from the captured command, step 320. Specifically, the integrating system extracts the identifier for the metadata associated with the captured command. Alternatively, the integrating system may extract information from the captured command that describes how the parameters comprising the metadata to be retrieved may be obtained from FES, e.g., the identities and locations of target records.

The integrating system converts the information extracted from the request from a format native to the FES, which may be the format in which the information was received or the "source" format, to a format expected by the external system corresponding to the metadata selected, which may be referred to as the "target" format, step 322. According to one embodiment of the invention as described above, the integrating system uses a conversion mechanism that employs a "hub-and-spoke" technique for this conversion. The conversion mechanism defines a central concept of metadata and data types that may be called the "central" format. The conversion mechanism converts the extracted information from the source format to the central format and then from the central format to the target format. The types of data that may be converted from one format to another include numbers, datetimes, text, binary large objects ("BLOB"), etc. Indeed, all data types are amenable to conversion by the conversion mechanism.

The integrating system instructs the external system containing the external metadata corresponding to the virtual metadata to return the properties comprising the metadata according to the received request, step 324. Advantageously, the integrating system may instruct the ES to retrieve multiple metadata properties depending on optional parameters contained in the command received from the FES. The integrating system converts the properties comprising the returned metadata from the ES format to the central format to the FES format in a manner similar to that previously described, step 326. The integrating system returns the converted resulting metadata to the FES, step 328. One point to note regarding the process presented in FIG. 3 is that the search and specific request sub-processes, steps 308 and 314 respectively, may be independent and not necessarily executed in the order presented. In other words, once the front-end system is configured to catch search and retrieve requests, either process may occur.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A method for providing access at a second computer system to metadata properties comprising metadata of a first computer system, wherein the second computer system issues searches for metadata and commands to retrieve metadata properties that may be captured externally, the method comprising:

capturing a search for metadata issued from the second computer system;

returning a list of metadata of the first computer system as a result for the captured search, wherein the list of metadata identifies metadata of the first computer system that matches a search pattern, wherein the metadata describes database-based data;

capturing a command to retrieve metadata properties issued from the second computer system;

if the metadata identified in the captured command is part of the list of metadata, retrieving metadata properties, converting the metadata properties to a format native to the second system, and returning the converted metadata properties to the second system, wherein retrieving metadata properties includes extracting instructions associated with the command to retrieve metadata properties; providing the extracted instructions to the first computer system; and instructing the first computer system to retrieve metadata properties according to the extracted instructions;

conducting a native metadata search on the second computer system to retrieve native metadata search results;

determining if the native metadata search results are to be suppressed; and     if the native metadata is to be suppressed presenting the converted metadata properties from the first computer system else presenting both the converted metadata properties and the native metadata.

2. The method of claim 1, wherein providing the extracted instructions comprises:

converting the extracted instructions from a format associated with the second computer system to a format associated with the first computer system; and     passing the converted instructions to the first computer system.

3. The method of claim 2, wherein converting the extracted instructions comprises:

converting the extracted instructions from a format associated with the second computer system to a third format; and     converting the extracted instructions from the third format to the format associated with the first computer system.

4. A method as in claim 1, wherein capturing the search for metadata issued from the second computer system comprises capturing the search for metadata, which is intended to be performed by a computer system other than the first computer system, so that the search for metadata can be redirected to the first computer system.

5. A method as in claim 4, wherein capturing the command to retrieve metadata properties issued from the second computer system comprises capturing the command to retrieve metadata, which is intended to be executed by a computer system other than the first computer system, so that the command can be redirected to the first computer system.

6. A method for providing access at a second computer system to metadata properties comprising requested metadata of a first computer system using a third computer system, wherein the metadata of the first computer system are externally accessible, and wherein the second computer system issues searches for metadata and commands to retrieve the metadata properties that may be captured externally, the method comprising:

capturing, at the third computer system, a search for metadata issued from the second computer system;

returning, from the third computer system to the second computer system, a list of metadata at the first computer system, wherein the list of metadata identifies metadata of the first computer system that matches a search pattern, wherein the metadata describes database-based data;

capturing, at the third computer system, a command to retrieve the metadata properties from the second computer system;

if the metadata identified in the captured command is contained within the list of metadata associated with data at the first computer system, causing, from the third computer system, the first computer system to retrieve the metadata properties, converting, at the third computer system, the metadata properties from the first computer system to a format native to the second computer system, and returning the metadata properties to the second computer system from the third computer system, wherein retrieving metadata properties includes extracting instructions associated with the command to retrieve metadata properties; providing the extracted instructions to the first computer system; and instructing the first computer system to retrieve metadata properties according to the extracted instructions;

conducting a native metadata search on the second computer system to retrieve native metadata search results;

determining if the native metadata search results are to be suppressed; and     if the native metadata is to be suppressed, presenting the converted metadata properties from the first computer system else presenting both the converted metadata properties and the native metadata.

7. The method of claim 6 comprising associating the third computer system with the second computer system, prior to the capture of the search, so as to enable the third computer system to capture searches for metadata and commands to retrieve metadata properties issued from the second computer system.

8. The method of claim 7 wherein the second computer system uses hooks to enable the external capture of searches for metadata and commands to retrieve metadata properties, and wherein associating the third computer system with the second computer system comprises registering the third computer system as a client of the hooks.

9. A method as in claim 6, wherein capturing, at the third computer system, a search for metadata issued from the second computer system comprises capturing the search for metadata, which is intended to be performed by a computer system other than the third computer system, so that the command can be redirected to the third computer system.

10. A method as in claim 9, wherein capturing, at the third computer system, a command to retrieve the metadata properties from the second computer system comprises capturing the command, which is intended to be executed by a computer system other than the third computer system, so that the command can be redirected to the third computer system.

11. A method for providing access at a second computer system to metadata properties comprising requested metadata of a first computer system, wherein the metadata of the first computer system is externally retrievable, and wherein the second computer system issues searches for metadata and commands to retrieve metadata properties that may be captured externally, the method comprising:

receiving a list of externally retrievable metadata of the first computer system, wherein the list of metadata identifies metadata of the first computer system that matches a search pattern, wherein the metadata describes database-based data;

capturing a command to retrieve properties comprising the requested metadata issued from the second computer system, intended to be executed by the second computer system, so that the command can be redirected to the first computer system;

if the list comprises metadata identified in the captured command, causing the first computer system to retrieve the metadata properties, wherein retrieving metadata properties includes extracting instructions associated with the command to retrieve metadata properties; providing the extracted instructions to the first computer system; and instructing the first computer system to retrieve metadata properties according to the extracted instructions;

conducting a native metadata search on the second computer system to retrieve native metadata search results;

determining if the native metadata search results are to be suppressed; and if the native metadata is to be suppressed, presenting the converted metadata properties from the first computer system else presenting both the converted metadata properties and the native metadata.

12. Computer program product comprising a computer readable medium having computer readable code embodied therein, the computer readable code, when executed, causing a computer to implement a method for providing access at a second computer system to metadata properties comprising requested metadata of a first computer system, wherein the metadata of the first computer system is externally retrievable, and wherein the second computer system issues searches for metadata and commands to retrieve metadata properties that may be retrieved externally, the computer program product including:

computer readable program code configured to cause a computer to capture a search for metadata issued from the second computer system;

computer readable program code configured to cause a computer to return a list of metadata of the first computer system as a result for the captured search, wherein the list of metadata identifies metadata of the first computer system that matches a search pattern, wherein the metadata describes database-based data;

computer readable program code configured to cause a computer to capture a command to retrieve metadata properties issued from the second computer system;

computer readable program code configured to cause a computer to, if the list comprises metadata identified in the captured command, retrieve metadata properties and return the metadata properties to the second computer system, wherein retrieving metadata properties includes extracting instructions associated with the command to retrieve metadata properties; providing the extracted instructions to the first computer system; and instructing the first computer system to retrieve metadata properties according to the extracted instructions computer readable program code configured to conduct a native metadata search on the second computer system to retrieve native metadata search results;

computer readable program code configured to determine if the native metadata search results are to be suppressed; and if the native metadata is to be suppressed, computer readable program code configured to present the converted metadata properties from the first computer system else present both the converted metadata properties and the native metadata.

13. The computer product of claim 12 wherein the computer readable program code to provide the extracted instructions comprises:

computer readable program code configured to convert the extracted instructions from a format associated with the second computer system to a format associated with the first computer system; and computer readable program code configured to pass the converted instructions to the first computer system.

14. The computer product of claim 13 wherein the computer readable program code to convert the extracted instructions comprises:

computer readable program code configured to convert the extracted instructions from a format associated with the second computer system to a third format; and computer readable program code configured to convert the extracted instructions from the third format to the format associated with the first computer system.

15. A computer program product as in claim 12, wherein to cause a computer to capture a search for metadata issued from the second computer system comprises to cause a computer capture the search for metadata, which is intended to be performed by the second computer system, so that the search for metadata can be redirected to the first computer system.

16. A computer program product as in claim 15, wherein to cause a computer to capture a command to retrieve metadata properties issued from a second computer system comprises to cause a computer to capture a command that is intended to be executed by the second computer system, so that the command can be redirected to the first computer system.

* * * * *